(12) United States Patent
Gillis

(10) Patent No.: US 12,276,298 B2
(45) Date of Patent: Apr. 15, 2025

(54) FASTENER DEVICE AND METHOD FOR ATTACHING POLYESTER FIBER PANELS TO A SUBSTRATE

(71) Applicant: ROTOFAST INC., Sydney (CA)

(72) Inventor: MacDonald Joseph Gillis, Sydney (CA)

(73) Assignee: ROTOFAST INC., Sydney (CA)

( * ) Notice: Subject to any disclaimer, the term of this patent is extended or adjusted under 35 U.S.C. 154(b) by 457 days.

(21) Appl. No.: 17/675,105

(22) Filed: Feb. 18, 2022

(65) Prior Publication Data

US 2022/0268303 A1     Aug. 25, 2022

Related U.S. Application Data

(60) Provisional application No. 63/151,173, filed on Feb. 19, 2021.

(51) Int. Cl.
| | | |
|---|---|---|
| *F16B 39/00* | (2006.01) | |
| *F16B 5/02* | (2006.01) | |
| *F16B 25/00* | (2006.01) | |
| *F16B 37/12* | (2006.01) | |

(52) U.S. Cl.
CPC ........ *F16B 5/0208* (2013.01); *F16B 25/0005* (2013.01); *F16B 37/127* (2013.01)

(58) Field of Classification Search
CPC ...... F16B 5/0208; F16B 5/02; F16B 25/0005; F16B 37/127
USPC ................... 411/16, 107, 133, 135, 346, 414
See application file for complete search history.

(56) References Cited

U.S. PATENT DOCUMENTS

| | | | | |
|---|---|---|---|---|
| 3,187,215 | A | * | 6/1965 | Linkroum ............... H01J 17/00 313/631 |
| 4,488,843 | A | * | 12/1984 | Achille ............... F16B 19/1081 411/72 |
| 4,881,861 | A | * | 11/1989 | Hewison ............... E04D 3/3603 411/383 |
| 5,304,023 | A | * | 4/1994 | Toback ................. F16B 33/004 411/387.3 |
| 5,531,554 | A | * | 7/1996 | Jeanson ................ F16B 39/282 411/533 |
| 6,439,817 | B1 | * | 8/2002 | Reed ....................... F16B 39/06 411/110 |

(Continued)

FOREIGN PATENT DOCUMENTS

| | | |
|---|---|---|
| CA | 2340590 C | 7/2006 |
| EP | 2339188 B1 | 4/2014 |
| WO | 2020025750 A1 | 2/2020 |

OTHER PUBLICATIONS

European Search Report issued on corresponding European Patent Application No. 22157634.1; dated Jun. 29, 2022; 8 pages.

*Primary Examiner* — Gary W Estremsky

(74) *Attorney, Agent, or Firm* — Miltons IP/p.i.

(57) ABSTRACT

A method and fastening device for attaching polyester fiber panels to a substrate, such as a wall or a ceiling. The fastening device comprises an anchor part for attachment to the substrate and a fastening part for attachment to the panel. The fastening part comprises a cylindrical portion, a helical member surrounding the cylindrical portion for penetrating the panel upon rotation of the helical member and a recess in the cylindrical portion for receiving the anchor part. The thread angle of the leading edge of the helical member is greater than the thread angle of the trailing edge.

18 Claims, 6 Drawing Sheets

(56) References Cited

U.S. PATENT DOCUMENTS

| | | |
|---|---|---|
| 6,652,208 B2 | 11/2003 | Gillis |
| 11,172,967 B2 * | 11/2021 | Black ................. A61B 17/8605 |
| 2004/0052606 A1 * | 3/2004 | Kerl ..................... F16B 13/002 |
| | | 411/80.1 |
| 2015/0219136 A1 | 8/2015 | Koelling |
| 2021/0040976 A1 | 2/2021 | Chen |

\* cited by examiner

FASTENER DEVICE AND METHOD FOR ATTACHING POLYESTER FIBER PANELS TO A SUBSTRATE

TECHNICAL FIELD

The present application relates to a fastening device and method for attaching a panel of semi-rigid material to a substrate. More particularly, the present application relates to a fastening device and method for attaching polyester fiber panels to a substrate, such as a wall or a ceiling. This fastener can also be used to attach panels made from for example extruded polystyrene such as Styrofoam®, mineral wool, and mycelium based fibre

BACKGROUND

There are existing fastening devices and methods for attaching panels of semi-rigid material to a substrate, such as for example a wall or a ceiling. Example fastening devices and methods are shown in patents CA2340590C and U.S. Pat. No. 6,652,208B2.

Polyester fiber panels and to a lesser extent mycelium are a growing segment of the acoustical panel industry. Polyester panels are typically created from recycled post-consumer P.E.T. (polyethylene terephthalate), such as for example pop bottle plastic fibers. These panels typically have the characteristics of being fire rated, inert and recyclable and have a high Noise Reduction Coefficient (NRC). Panels are generally white in color, do not disburse fibres into the environment when cut or disturbed (like for instance fibreglass and mineral wool). Panels do not need a exterior covering like fabric as with other fibre based panels.

A drawback and a constraint on the adoption of these panels is a lack of secure, easy to install, hidden attachment device options. Particularly, the high connective strength between fibers in the core of the polyester panels makes it difficult for some common types of fasteners to penetrate into the panel. For example, the fastener devices described in patents CA2340590C and U.S. Pat. No. 6,652,208B2 do not work on panels made of polyester fibers. Also, panels made from fibreglass sometimes use an epoxy resin to attach mounting points to the panels. This method is not possible with polyester panels because the resins cannot be absorbed into this type of fibre. Other types of fasteners that can penetrate fibreglass such as impaling hooks can't penetrate the polyester fibre.

SUMMARY

The method and fastening devices of the present application facilitate the attachment of polyester fiber panels to a substrate, such as for example a wall or a ceiling. An advantage of the method and the fastening devices of the present application is that it makes the attachment of polyester fiber panels to a substrate quick and easy without the need for glue or resins. Another advantage of the method and the fastening devices of the present application is that the fastening devices are hidden, that is they are not seen on the polyester fiber panel after attachment. The high fiber connectivity of polyester fiber panels is a problem (e.g. negative) when choosing a fastening device and method but becomes a positive when coupled with the method and fastening devices of the present application.

There is provided a fastener device for attaching a panel to a substrate, comprising an anchor part for attachment to the substrate; a fastening part for attachment to the panel, the fastening part comprising a cylindrical portion; a helical member surrounding the cylindrical portion for penetrating into fibers of the panel upon rotation of the helical member; a recess in the cylindrical portion for receiving the anchor part, wherein the thread angle of the leading edge of the helical member is greater than the thread angle of the trailing edge and wherein the panel is made of polyester fiber material.

A fastener device for attaching panel to a substrate, the device comprising a substrate bracket for attachment to the substrate; and a panel bracket for attachment to the panel, the panel bracket comprising: a cylindrical portion; a helical member surrounding the cylindrical portion for penetrating into fibers of the panel upon rotation of the helical member; a compression flange surrounding the base of the cylindrical portion; a bottom bracket extending from the compression flange; and a recess in the bottom bracket and extending through the cylindrical portion for receiving an installation tool to secure the panel bracket to the panel, wherein the substrate bracket has a slot to receive the bottom bracket of the panel bracket, wherein the thread angle of the leading edge of the helical member is greater than the thread angle of the trailing edge, and wherein the panel is made of polyester fiber material.

A fastener device for attaching a panel to a substrate, the fastener device comprising: a cylindrical portion; a helical member surrounding the cylindrical portion for penetrating the panel upon rotation of the helical member; an installation portion extending from the flange for rotating the helical member for penetrating into fibers of the panel; wherein the thread angle of the leading edge of the helical member is greater than the thread angle of the trailing edge, and wherein the panel is made of polyester fiber material.

A fastener device for attaching a panel to a substrate, comprising: a fastening part for attachment to the panel, the fastening part comprising: a cylindrical portion; and a helical member surrounding the cylindrical portion for penetrating into fibers of the panel upon rotation of the helical member; wherein the thread angle of the leading edge of the helical member is greater than the thread angle of the trailing edge, and wherein the panel is made of polyester fiber material.

A method for attaching a polyester fiber panel to a substrate using a fastener, the fastener having a cylindrical portion, a helical member surrounding the cylindrical portion where the thread angle of the leading edge of the helical member is greater than the thread angle of the trailing edge, and a compression flange surrounding the cylindrical portion, the method comprising: cutting a recess into the back side of the panel; rotating the fastener into the recess, wherein the helical member penetrates into the fibers of the panel, and wherein the flange compresses the fiber of the panel and increases the density of fiber around the helical member. As well, attaching the panel to the substrate using an attachment means that engages with the bottom of the flange.

DETAILED DESCRIPTION

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

Figure 1:
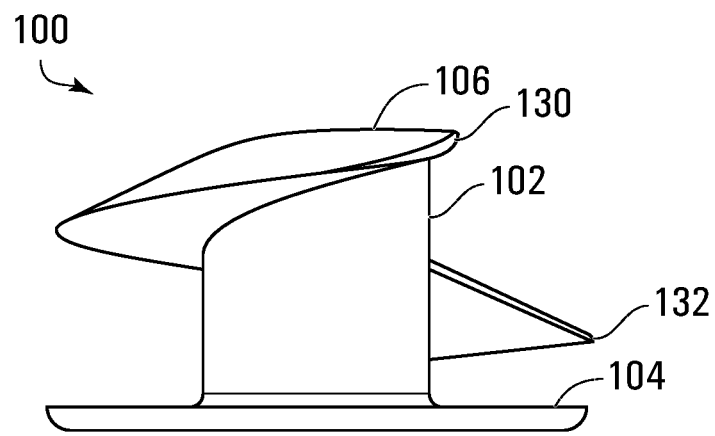
FIG. 1 shows a fastening part of a fastening device in accordance with one example embodiment of the present disclosure.
Figure 2:
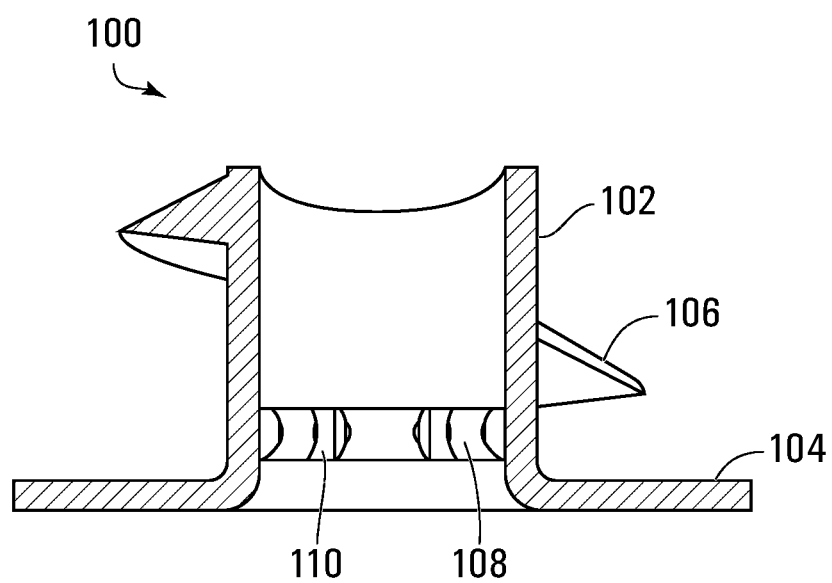
FIG. 2 shows a cutaway view of the fastening part shown in FIG. 1 in accordance with one example embodiment of the present disclosure.
Figure 3:
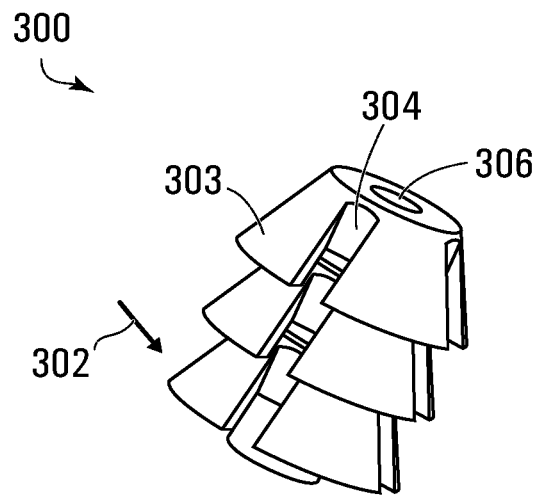
FIG. 3 shows a ratchet fastener for use with the fastening part of FIG. 1 in accordance with one example embodiment of the present disclosure.

FIGS. 1 to 3 show a first form of the fastening device for use with polyester fiber panels in accordance with one embodiment of the present application. The fastening device comprises a fastening part 100 and an anchor part 300. The fastening part 100 as shown in FIG. 1 comprises a cylindrical structure 102, a compression flange 104 and threads 106. The fastening part 100 is a hidden fastener as it is not visible or minimally visible on the panel 20 after installation. The fastening device 100 shown in FIG. 1 may also be referred to as a tube fastener. The threads 106 are helical in shape and are integrated around the exterior of the cylindrical structure 102. The cylindrical structure 102 is attached at one end to the compression flange 104. The compression flange is shown as circular in shape, but other shapes may be used, such as rectangular or square.

A method of installing the fastening part 100 to a panel 20, according to an example embodiment of the present application includes the step of creating a recess (e.g. a cut) in the back side of the polyester fiber panel 20. This can be done in one case by cutting a slot perpendicular to the back face that is slightly deeper than the fastening device and longer than the diameter of the fastening device. A typical size used for some polyester panels is ¾ inch deep and 1½ inches long. Other recesses, such as for example cored holes or punched slots, can also be used.

The fastening devices of the present application are a thread type fastener that when rotated with an installation tool imbeds into the recess on the polyester fiber panel 20. The flange 104 that is located on the tailing edge of the cylindrical structure 102 of the fastening part 100 compresses the fiber of the polyester panel 20. This compression increases the density of the fiber material around the threads 106 and the amount of pull-out force that can be applied is increased significantly. Also, the threads 106 design has been specifically designed to create a high pull-out strength by embedding into walls of the recess created in the panel. The leading edge thread angle is high in relation to the thread angle of the trailing edge. In an example embodiment, the leading edge 130 angle of the threads 106 is 50 degrees or higher, and the trailing edge 132 angle of the threads is 20 degrees (or close to 20 degrees). For example, conventional screws typically have threads with a trailing edge angle and leading edge angle that are near equal. If the thread angles of the leading edge 130 and the trailing edge 132 of the fastener part 100 were the same, the trailing edge would slip against the walls of the recess. With the thread 106 design of the fastener part 100 the trailing edge 132 of the thread 106 digs into the panel 20. The pull-out strength increases with an increase in the force applied to the fastener. The fasteners shown in FIGS. 7 to 12 also have threads that are helical in shape and are designed with the same angles as described above in respect of threads 106.

Creating this type of recess (e.g. cut) in other fiber panel materials would greatly decrease the integrity of the panel. Because of the high connective strength of the polyester panel 20 fiber and the force applied by the compression flange 104, and the shape of the threads 106, the pull-out force applied to the threads 106 becomes very high. A benefit of the method and fastening devices of the present application is that no tearing of the panel 20 material or increasing of the length of the recess (e.g. cut) occurs.

When the fastener part 100 is seated (e.g. received) in the recess of the panel 20 and the fiber has been compressed various types of fastening device anchors can be used.

FIG. 2 shows a cutaway view of the fastening part 100 of FIG. 1, in accordance with an example embodiment of the present application. As shown in FIG. 2, the interior of the cylindrical structure 102 is partially hollow and contains near the compression flange 104 an internal structure comprising a raised interference face 108 and a drive member slot 110. The drive member slot 110 is sized and shaped to receive an installation tool, such as the one shown in FIG. 4. The raised interference face 108 is designed to mate with elements on the anchor part, such as the anchor part shown in FIG. 3.

FIG. 3 shows a ratchet fastener 300 (may also be referred to as the anchor part) for use with the fastening part 100 shown in FIGS. 1 and 2. The ratchet fastener 300 shown is cylindrical in shape and comprises a plurality of mating structures 302 in a stacked formation. Each mating structure 302 is comprised of a plurality of fins 303 and recesses 304 positioned in between the fins 303. The mating structures 302 may also be referred to as 'hat' mates. The raised interference face 108 of the fastening part 100 functions to mate with the mating structures 302 with the fins 303 of the ratchet fastener 300. In FIG. 3 the ratchet fastener 300 is shown with three mating structures 302, in other embodiments there may be one mating structure 302 or any number of mating structures 302.

When the anchor part is inserted into the fastening part, the fins 303 of the ratchet fastener 300 deflect inwards to bypass the interference face 108. They return to their original location as they pass the interference face 108. In this embodiment, the interference faces 108 are shaped as hemispheres (e.g. dome-shaped, curved). The hemisphere shape aids in the insertion of the ratchet fastener 300 and allows the ratchet fastener 300 to be removed when a predetermined amount of force is applied. This allows the panel to be uninstalled if desired. Other shapes can be employed as well. For example instead of a ratchet type plug, a ball shaped portion could be inserted into the interference face 108, for a one snap (e.g. friction fit) installation and removal.

Figure 4:
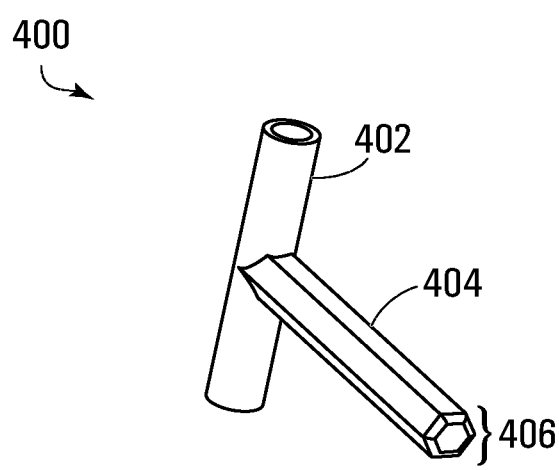
FIG. 4 shows an installation tool for use with the fastening part of FIG. 1 and ratchet fastener of FIG. 3 in accordance with one example embodiment of the present disclosure.
Figure 6:
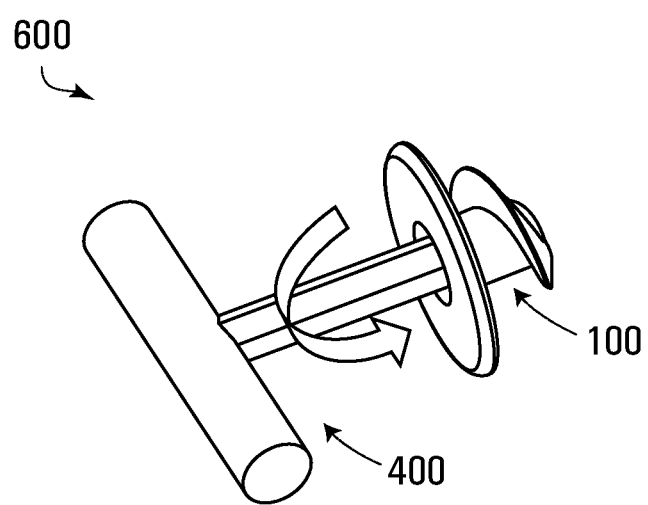
FIG. 6 shows the installation tool inserted into the fastening part in accordance with one example embodiment of the present disclosure.

FIG. 4 shows an installation tool 400 for use with the fastening part 100 according to an example embodiment. The installation tool 400 comprises a first elongated portion 402 and a second elongated portion 404, together these elongated portions form a T-shape. The end of the second elongated portion 404 is shown with a hexagon shaped cross-section 406. The fastening part 100 is rotated into the slot made in the panel 20 with the installation tool 400. In this example embodiment, the installation tool 400 has a hexagon cross-section shape, however other shapes of the installation tool 400 can be used such as for example slot, square, etc. FIG. 6 illustrates the use of the installation tool 400 inserted into the fastening part 100 and the rotation of the installation tool 400 to secure the fastening part 100 to the panel 20. That is the threads 106 of the fastener part 100 engage into the panel 20. In other embodiments, the installation tool may be of a different shape and configuration (e.g. L-shaped hex key, allen key).

Figure 5:
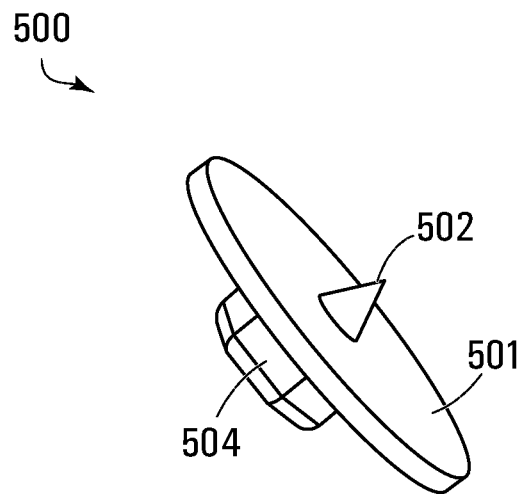
FIG. 5 shows a marking plug in accordance with one example embodiment of the present disclosure.

The alignment of the ratchet fastener (e.g. anchor part) 300 and the fastening part 100 is aided by the use of a substrate marking plug 500 (FIG. 5). The example marking plug 500 shown in FIG. 5 comprises a circular disk 501, a connector protrusion 504 on a first side of the disk 504, where the connector protrusion 504 is shaped to align with the drive member slots 110 and a pointed protrusion 502 a second side of the disk 504. After the fastening part 100 is installed in the slots created in the panel 20, the connector protrusion 504 of the marking plug 500 is inserted into the drive member slots 110 of the fastening part 100. The panel 20 is then pushed against the substrate at its installation location, and the pointed protrusion 502 on the marking plug 500 indents the substrate 30. This indentation matches the location of the ratchet fastener 300 (e.g. anchor part) in relation to the fastening device 100. The ratchet fastener 300 is attached to the substrate 30 with a screw that passes through hole 306 on the fastener 300. Different types of substrates, such as for example block and drywall would require different types of screws and other types of substrates may require other types of securing means.

The fastening devices of the present application are substantially hidden when installed on the polyester fiber panel. As the panel portion of the fastener part 100 is installed on the back of the panel, the fastener part 100 is hidden by the face of the panel when the wall/ceiling portion (e.g. anchor part 300) of the fastener device is mated with the panel portion (e.g. fastener part 100) of the fastener device.

FIGS. 7 to 11 show bracket assemblies for use with polyester fiber panels in accordance with another example embodiment of the present application.

Figure 7:
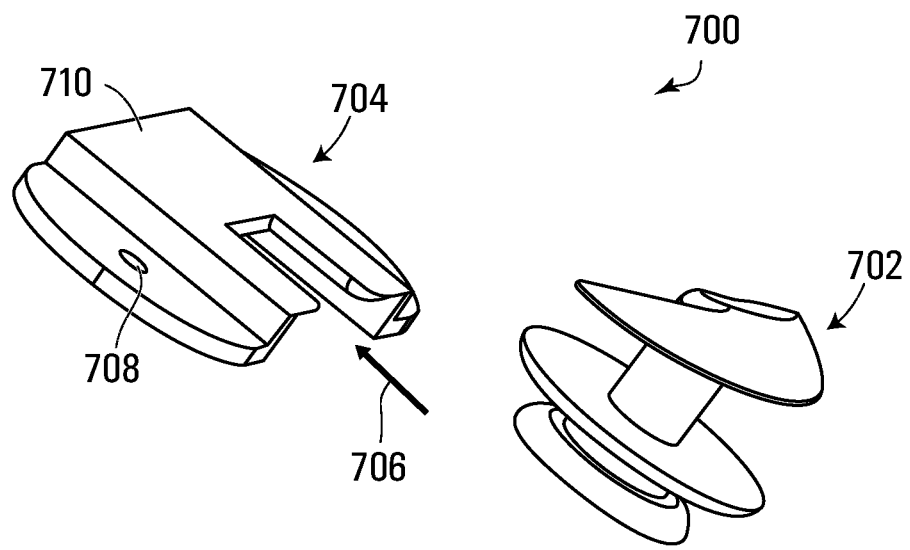
FIG. 7 shows a bracket fastener device in accordance with a second example embodiment of the present disclosure.

FIG. 7 shows a bracket assembly (may also be referred to as a fastener device) 700 that comprises a circular panel bracket 702 and a wall bracket 704 (e.g. substrate bracket). The wall bracket 704 is attached to the substrate 30 with a screw fastener through holes 708 or other securing means. The wall bracket 704 has a recess or slot 706 that is shaped and sized to enable the panel bracket 702 to mate with the wall bracket 704. As well, the wall bracket 704 has a compression flange 710. In other embodiments the wall bracket 704 (e.g. bracket to attach to the substrate 30) may have a different shape and configuration to receive other types of panel brackets.

Figure 10:
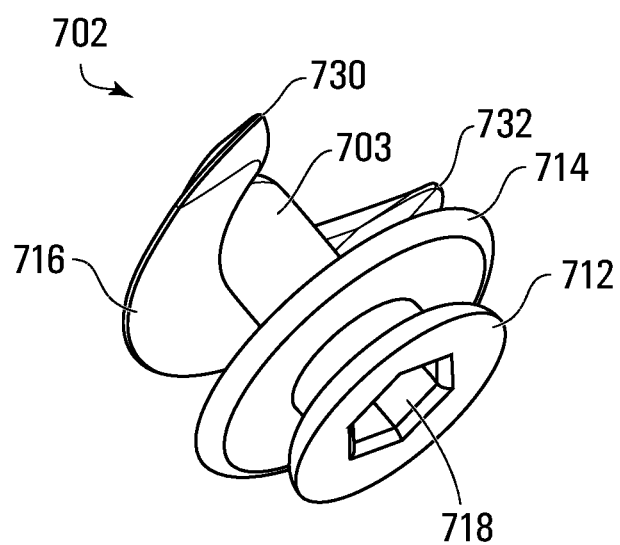
FIG. 10 shows a circular bracket fastener in accordance with a second example embodiment of the present disclosure.

Another view of the circular panel bracket 702 is shown in FIG. 10. The circular panel bracket 702 comprises a cylindrical structure 703, a circular bottom bracket 712, a compression flange 714, external threads 716 extending from the cylindrical structure 703 and a drive recess 718. In FIG. 10, the drive recess 718 is hexagon in shape, however the drive recess 718 may be other shapes, such as for example, square. The flange 714 that is located on the tailing edge of the cylindrical structure 703 compresses the fiber of the polyester panel 20. This compression increases the density of the fiber material around the threads 106 and the amount of pull-out force that can be applied is increased significantly. Also, the threads 716 are designed the same as threads 106. The threads 716 design has been specifically designed to create a high pull-out strength by embedding into walls of the recess created in the panel. The leading edge thread angle is high in relation to the thread angle of the trailing edge. In an example embodiment, the leading edge 730 angle of the threads 716 is 50 degrees or higher, and the trailing edge 732 angle of the threads is 20 degrees (or close to 20 degrees).

The bracket assembly 700 may be used with the cut slot method previously discussed. The installation of the panel bracket 702 of the bracket assembly 700 is achieved by turning the panel bracket 702 into the slot created in the panel 20. In this example embodiment, the hexagon shaped drive recess 718 accepts a hexagon shaped installation tool, such as for example the installation tool 400. The drive recess 718 can also accept a reusable marking plug (for example, the marking 500) which can aid in locating the wall bracket 704 of the bracket assembly 700 on the substrate 30.

Figure 8:
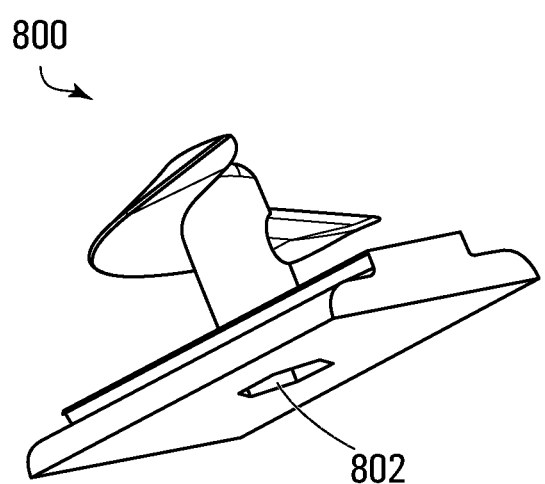
FIG. 8 shows a rectangular bracket fastener in accordance with a second example embodiment of the present disclosure.
Figure 9:
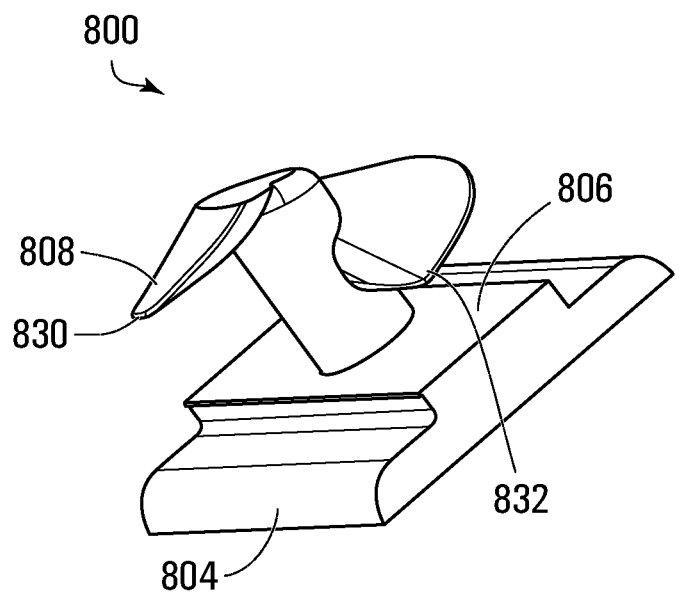
FIG. 9 shows a second view of the rectangular bracket fastener in accordance with a second example embodiment of the present disclosure.

FIGS. 8 and 9 show a rectangular panel bracket 800. FIG. 8 shows the drive recess 802 of the rectangular panel bracket 800. FIG. 9 shows elements of the rectangular panel bracket 800 including a cylindrical structure 803, rectangular bottom portion 804, a compression flange 806 and external threads 808 extending from the cylindrical structure 803. The compression flange 806, when completely seated in the panel 20, separates the panel bracket 800 from the panel 20. The flange 806 that is located on the tailing edge of the cylindrical structure 803 compresses the fiber of the polyester panel 20. This compression increases the density of the fiber material around the threads 808 and the amount of pull-out force that can be applied is increased significantly. Also, the external threads 808 are designed the same as threads 106. The threads 808 design have been specifically designed to create a high pull-out strength by embedding into walls of the recess created in the panel. The leading edge thread angle is high in relation to the thread angle of the trailing edge. In an example embodiment, the leading edge 830 angle of the threads 808 is 50 degrees or higher, and the trailing edge 832 angle of the threads is 20 degrees (or close to 20 degrees).

The panel bracket 702 shown in FIG. 7 is circular in shape and the panel bracket 800 shown in FIGS. 8 and 9 are rectangular in shape, however the panel bracket may comprise a different shape and configuration, such as for example square shaped.

Figure 11:
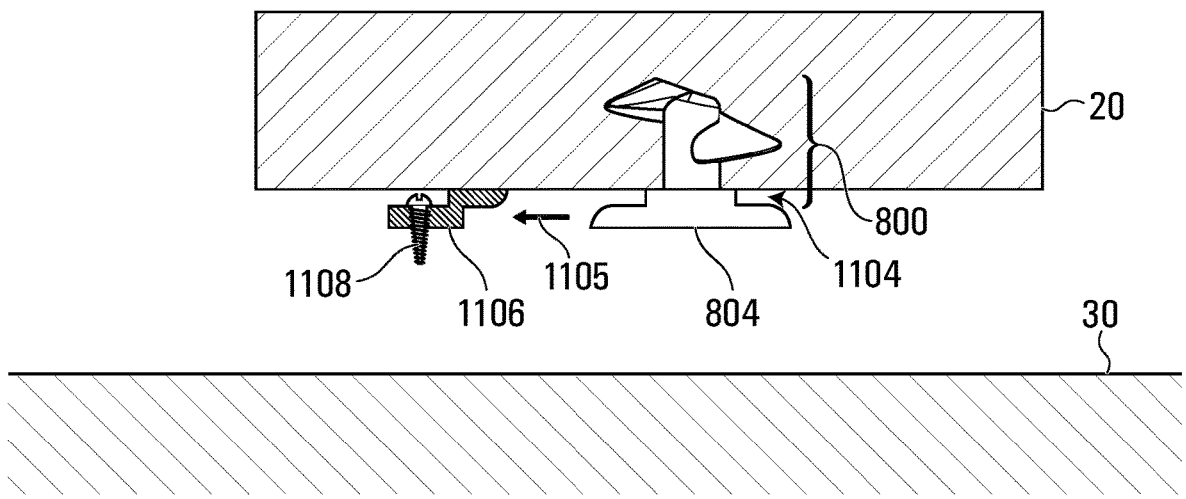
FIG. 11 shows a bracket fastener device installed on a panel in accordance with a second example embodiment of the present disclosure.

FIG. 11 shows the rectangular panel bracket 800 installed into a panel 20. The rectangular bottom portion 804 as shown is flush against the substrate 30 (e.g. wall or ceiling). The external threads 808 are installed into the polyester panel 20. The wall or ceiling bracket 1106 is affixed to the substrate 30 using a mounting screw 1108. As previously discussed, the compression flange 806, when completely seated in the panel 20, separates the panel bracket 800 from the panel 20, and this separation forms a recess 1104. The recess 1104 on the rectangular panel bracket 800 engages with a corresponding recess 1105 on the wall or ceiling bracket 1106.

Figure 12:
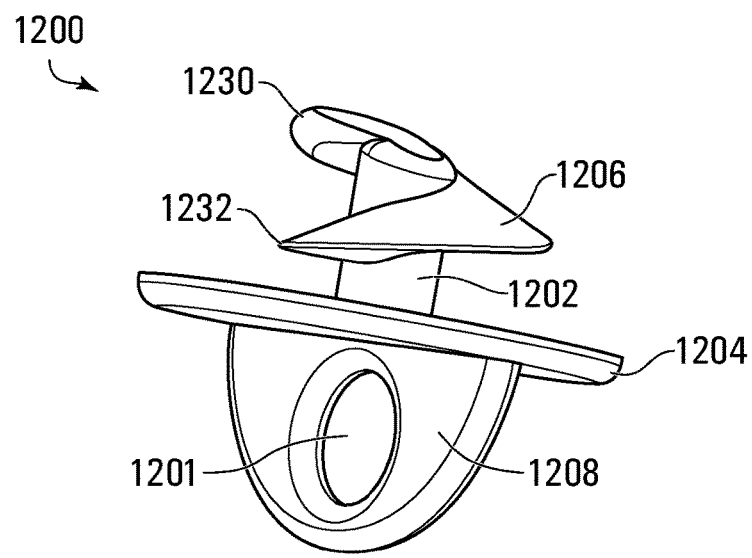
FIG. 12 shows a fastener device in accordance with a third example embodiment of the present disclosure.

FIG. 12 shows an example eye hook fastening device according to another embodiment of the present application. The eye hook fastening device 1200 comprises an eye hook 1201, a cylindrical structure 1202, a compression flange 1204, exterior threads 1206 extending from the cylindrical structure 1202 and an installation member 1208. The flange 1204 that is located on the tailing edge of the cylindrical structure 1202 compresses the fiber of the polyester panel 20. This compression increases the density of the fiber material around the threads 1206 and the amount of pull-out force that can be applied is increased significantly. Also, the external threads 1206 are designed the same as threads 106. The threads 1206 design have been specifically designed to create a high pull-out strength by embedding into walls of the recess created in the panel. The leading edge thread angle is high in relation to the thread angle of the trailing edge. In an example embodiment, the leading edge 1230 angle of the threads 1206 is 50 degrees or higher, and the trailing edge 1232 angle of the threads is 20 degrees (or close to 20 degrees).

The eye hook 1201 is an opening that is shown as being circular in shape, but it may be formed with other shapes. One example application for using the eye hook fastening device 1200 are acoustical panels. Acoustical panels are sometimes hung horizontally with the back face of the panel facing toward the ceiling. With the eye hook fastening device 1200, the eye hook 1201 is fixed or integrated with the compression flange 1204. This enables attachment of hanging hardware, chain, wire, or other attachment means to the eye hook 1201. The hook or hanging point can be represented as the eye hook 1201 shown in FIG. 12, or can be structured differently for example an open hook (e.g. not fully enclosed or surrounded by the installation member 1208).

The portion around the eye hook 1201 may function as the installation turning member 1208. This makes it possible to turn the exterior threads 1206 into the recess in the back of the panel 20, far enough to compress the panel fibers between the threads 1206 and the compression flange 1204.

In a further embodiment (not shown), a fastener with the same exterior shape and configuration (e.g. threads, cylindrical structure, flange) as the fastener part 100 shown in FIG. 1 is provided. With this embodiment, the bottom (e.g. underneath) of the flange may be attached directly to the substrate using attachment means such as hook and loop (e.g. Velcro™) or double sided tape.

As described in the above embodiments, the panel with the installed fastener may be attached to the substrate using various kinds of attachment means. The attachment means engages with the bottom of the flange and may be, for example, an anchor part (e.g. shown in FIG. 3), a substrate bracket (e.g. shown in FIGS. 7 and 11), eye hook (e.g. shown in FIG. 10), hook and loop attachment or double-side tape. Other attachment means may also be used.

All of the fastening devices and bracket assemblies described in the application may be molded of plastic material or other materials, such as die cast zinc, or machined metal such as aluminum.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A fastener device for attaching a panel to a substrate, comprising:
   an anchor part for attachment to the substrate;
   a fastening part for attachment to the panel, the fastening part comprising:
      a cylindrical portion;
      a helical member surrounding the cylindrical portion for penetrating into fibers of the panel upon rotation of the helical member;
      a recess in the cylindrical portion for receiving the anchor part,
      wherein the thread angle of the leading edge of the helical member is greater than the thread angle of the trailing edge and
      wherein the panel is made of polyester fiber material and wherein there is an internal structure within the recess of the cylindrical portion, the internal structure comprising a raised interference face and a drive member slot.

2. The fastener device of claim 1, wherein the leading edge thread angle is 50 degrees or greater and the trailing edge thread angle is 20 degrees.

3. The fastener device of claim 1 further comprising:
   a compression flange surrounding the base of the cylindrical portion, wherein when the fastening part is installed the compression flange compresses the fiber of the panel and increases the density of fiber around the helical member.

4. The fastener device of claim 1, wherein the raised interference face is dome-shaped.

5. The fastener device of claim 1, wherein the anchor part has a plurality of external mating structures in a stacked formation.

6. A fastener device for attaching a panel to a substrate, comprising:
   a fastening part for attachment to the panel, the fastening part comprising:
      a cylindrical portion; and
      a helical member surrounding the cylindrical portion for penetrating into fibers of the panel upon rotation of the helical member; and
      a recess in the cylindrical portion, wherein the recess has an internal structure comprising a raised interference face and a drive member slot, wherein the thread angle of the leading edge of the helical member is greater than the thread angle of the trailing edge, and wherein the panel is made of polyester fiber material.

7. The fastener device of claim 6, wherein the leading edge thread angle is 50 degrees or greater and the trailing edge thread angle is 20 degrees.

8. The fastener device of claim 6 further comprising:

a compression flange surrounding the base of the cylindrical portion, wherein when the fastening part is installed in the panel the compression flange compresses the fiber of the panel and increases the density of fiber around the helical member.

9. The fastener device of claim 8, the fastening part further comprising a bottom bracket extending from the flange.

10. The fastener device of claim 8, the fastening device further comprising an installation portion extending from the flange for rotating the helical member for penetrating the panel.

11. The fastener device of claim 10, wherein the installation portion has a hole for receiving a hanging attachment.

12. The fastener device of claim 6, further comprising:

a recess in the cylindrical portion for receiving a driving means.

13. The fastener device of claim 6, wherein the bottom of the flange is attached to the substrate using a hook and loop attachment or double-sided tape.

14. The fastener device of claim 6, further comprising an anchor part having a plurality of fins in a stacked formation.

15. The fastener device of claim 14, wherein when the anchor part is inserted into the fastener part, the plurality of fins on the anchor part deflect inwards to bypass the interference face on the fastener part.

16. The fastener device of claim 6, further comprising a substrate bracket for attachment to a substrate, the substrate bracket configured to receive the bottom bracket.

17. A method for attaching a polyester fiber panel to a substrate using a fastener, the fastener having a cylindrical portion, a helical member surrounding the cylindrical portion where the thread angle of the leading edge of the helical member is greater than the thread angle of the trailing edge, a compression flange surrounding the cylindrical portion, and a recess in the cylindrical portion, wherein the recess has an internal structure comprising a raised interference face and a drive member slot, the method comprising:

cutting a recess into the back side of the panel;

rotating the fastener into the recess, wherein the helical member penetrates into the fibers of the panel, and wherein the flange compresses the fiber of the panel and increases the density of fiber around the helical member.

18. The method of claim 17 further comprising:

attaching the panel to the substrate using an attachment means that engages with the bottom of the flange.

* * * * *